Sept. 29, 1931.　　　　M. F. BATES　　　　1,825,139
REGULATING SYSTEM
Filed April 22, 1929
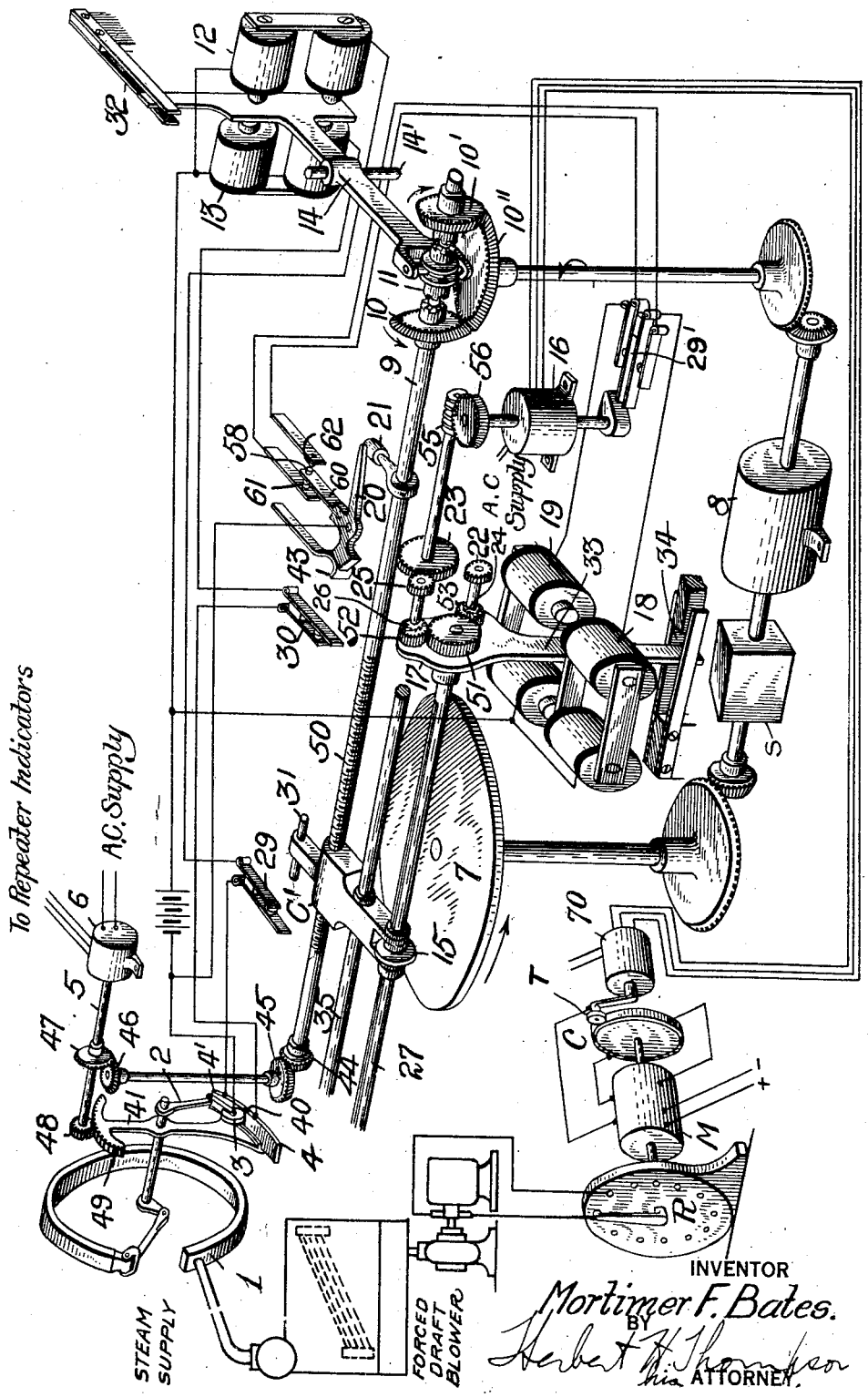
INVENTOR
Mortimer F. Bates.
BY Herbert H. Thompson
his ATTORNEY.

Patented Sept. 29, 1931

1,825,139

UNITED STATES PATENT OFFICE

MORTIMER F. BATES, OF BROOKLYN, NEW YORK, ASSIGNOR TO SPERRY GYROSCOPE COMPANY, INC., OF BROOKLYN, NEW YORK, A CORPORATION OF NEW YORK

REGULATING SYSTEM

Application filed April 22, 1929. Serial No. 357,217.

This invention relates to regulating systems and is particularly adapted to regulate steam supply by controlling the boiler auxiliaries automatically. It is the principal object of this invention to provide what may be characterized as a dynamic control in that the rate of withdrawal of fluid or energy from the system is matched against the rate of supply and the latter is controlled to increase or decrease as the rate of withdrawal increases or decreases in order to maintain a predetermined condition in the system.

Further objects and advantages of this invention will become apparent in the following detailed description thereof.

The accompanying drawing is an assembly view, largely in perspective and partly diagrammatic, of one embodiment of my invention.

Referring to said drawing, I have shown a means for registering the rate of withdrawal of energy from the system. In this description I shall assume the system controlled here is a steam supply system, but it will be understood as hereinbefore indicated that the invention has general application. For indicating the rate of withdrawal of steam from the system, I have provided a gauge 1 which may be in the form of a Bourdon tube whose movement, in accordance with increase or decrease of pressure within the system corresponding to rate of withdrawal of steam from the system relative to rate of supply, is caused to actuate an electric contact system comprising a trolley 3 carried by an arm 2 fixed to move in accordance with the movements of the gauge and cooperating with contact segments 4—4' separated by an insulating segment 40. The said contact segments 4 and 4' and insulating segment 40 may be carried by a lever 41. When the pressure within the system falls or rises, trolley 3 makes contact with segment 4' or 4, respectively, to actuate, through means about to be described, a master transmitter 16 in one direction or the other to actuate by means of a synchronous pilot motor 70. Said synchronous motor having little torque preferably turns the controlling rheostat R through the intermediary of a reversible D. C. power motor M through suitable contact means, such as the trolley and contact segments indicated at C. For this purpose a shaft of motor 70 is shown as turning a trolley T about the reversing contact drum C on the shaft of the motor M so that the motor M in circuit with the trolley and contacts is caused to follow the movements of the synchronous motor 70 and hence turn the rheostat R. This pilot motor may merely operate indicators to indicate to an operator the condition prevailing in the system so that said operator may then control the fuel, air or damper, or preferably as here shown, the rheostat motors M may operate a rheostat R controlling the speed of the auxiliary motors which control the air supply, the air damper, or stoker in the necessary direction to correct the condition prevailing in the system, that is to say, to increase the pressure if the gauge indicates that the pressure is falling and to decrease the pressure if the gauge indicates that the pressure is rising. Rate of supply of energy to the system is thus matched against rate of withdrawal.

The control of master transmitter 16 from the gauge will now be described in detail. When trolley 3 engages contact segment 4 or contact segment 4', it energizes one or the other of two sets of magnets 12—13 to rock a lever 14 about its pivot 14' to cause a clutch 11, carried at the outer end of said lever 14 and splined to a shaft 9, to engage one or the other of gears 10—10' in engagement with gear 10'' driven from a constantly running motor 8 through any suitable gearing. Rotation is, therefore, imparted to shaft 9, when trolley 3 engages contact segment 4 or contact segment 4', in one direction or the other to cause a carriage C' carrying a roller 15 at its outer end and in engagement with a screw threaded portion 50 of shaft 9 at its other end to move said roller in one direction or the other from the center of a disc 7 with which it is in frictional engagement. Said disc 7 is also continuously driven from the continuously operating motor 8. The carriage C' may be supported upon a guide rod 35 at its center in addition to the support upon the shaft 9 at its outer end.

The rotation of roller 15 is caused to operate the master transmitter 16 by the following mechanism: The roller 15 is splined upon a shaft 27 which it, therefore, rotates to rotate a gear 51 and thence through gearing 52 and 25, or 53 and 22, to rotate gear 23, which is geared through any suitable gearing, such as worm 55 and worm-wheel 56, to the shaft of transmitter 16. The drive from gear 51 to gear 23 lies either through gears 52 and 25 or through gears 53 and 22. The said gears 51—52—53—25 and 22 form a tumbler system 17 pivotally mounted for rotation about the axis of shaft 27 to bring either gear 25 or gear 22 into mesh with gear 23. For actuating said tumbler system, I may provide upon shaft 9 an arm 21 which is adapted to engage one side or the other of an arm of lever 20 to actuate said lever in one direction or the other depending upon the direction of rotation of shaft 9, which in turn depends upon the engagement of trolley 3 with either contact segment 4 or contact segment 4'. The actuation of said lever 20 will cause one or the other of contacts 58, carried by an arm 60, to engage contacts 61 or 62 depending upon the direction of actuation of lever 20 to cause energization of one or the other of two sets of magnets 18 or 19 which acts upon an armature 33 of the tumbler system to actuate said tumbler system in one direction or the other to cause gear 22 or gear 25 to engage gear 23. A detent spring 43 may be provided to hold lever 20 in each of its two actuated positions.

The direction of rotation of gear 51 depends upon the position of roller 15 with respect to the center of disc 7. At one side of said disc 7, roller 15 rotates in one direction, and at the other side of said center, roller 15 rotates in the opposite direction and gear 51 rotates correspondingly. Gears 52 and 53 are rotated in the same direction by gear 51, but gear 52 transmits only one direction of rotation to gear 25, and gear 53 transmits only the opposite direction of rotation to gear 22, by reason of the inter-position between gears 52 and 53 and their respective shafts of oppositely positioned ratchets 26 and 24. Thus, while gear 51 is rotated in one direction, clockwise, e. g., to cause both gears 52 and 53 to rotate counter-clockwise, only gear 25 is rotated because ratchet 24 is idling. Hence, the necessity for operating the tumbler system to bring the proper gear 22 or 25 into engagement with gear 23 when the direction of rotation changes.

While the roller 15 is operating outwardly from the center in one direction, one or the other of the gears 22 or 25 is in engagement with gear 23 and is operating the transmitter 16. In the drawing gear 25 is effective to operate the master transmitter. When the roller starts back toward the center, due to reversal of rotation of shaft 9, the tumbler is actuated to bring the gear 22 into engagement with gear 23, but no opposite rotation of transmitter 16 is effected until roller 15 passes the center and reverses its direction of rotation and hence reverses the direction of rotation of gear 51. This is due to the fact that the direction of rotation of roller 15 remains the same until it passes the center of disc 7. Thus, in the example shown, gear 51 continues to rotate clockwise, which causes gear 53 to rotate counterclockwise, thus causing idling of the clutch 24, and hence no transmission of movement to gears 22 and 23 or to the transmitter 16 which remains in its maximum actuated position. After roller 15 passes the center and reverses the direction of rotation of gear 51, then ratchet 24 is effective to drive gears 22 and 23 and operate the transmitter 16 in the opposite direction.

The master transmitter 16 continues to be actuated to increase or decrease the supply of energy to the system according as trolley 3 engages contact segment 4 or contact segment 4'. While the said transmitter is being actuated, a follow-back is provided from driving shaft 9 through suitable gearing, such as 44 to 49 inclusive, to cause the contact segments to follow the movements of the trolley.

For the purpose of illustration, we will assume that energy in this case in the form of steam, is being withdrawn from the system faster than said energy is being supplied to the system, which will cause a drop in pressure and a collapse in movement of Bourdon tube 1 to cause trolley 3 to engage contact segment 4'. Through the mechanism hereinbefore described, master transmitter 16 is actuated due to the travel of roller 15 outwardly on disc 7 to increase the steam supply. The rotation of shaft 9 in moving roller 15 outwardly causes the lever 41 with its contact segments to follow after the trolley and when the shaft 9 and hence the transmitter 16 has been actuated rapidly enough to supply steam to the system so fast that insulation segment 40 has caught up with trolley 3, then steam is being supplied to the system rapidly enough to counteract further decrease of pressure therein. Further decrease in pressure in the system having been arrested, it is now necessary to restore the pressure to the original setting. It is, therefore, necessary to continue to increase the supply of pressure. For this reason means is provided whereby roller 15 continues to operate even after trolley 3 engages the insulated segment 40 to continue to operate transmitter 16 and hence increase the supply of steam to the system. The result is that pressure builds up within the system and trolley 3 now engages the other contact segment 4 to reverse the direction of operation of shaft 9 and move roller 15 toward the center of disc 7. It is desired, however, that pressure continue to build up to the original pressure and, therefore, during the return movement of roller 15 toward the center of disc 7, although the tumbler has been shifted to change the gear connection, the master transmitter remains in its operated position, owing to the construction of the tumbler mechanism hereinbefore described, until the roller 15 has passed the center of disc 7 in the opposite direction. During this interval the shaft 9 is returning the lever 41 toward the original position following closely behind trolley 3 so that when roller 15 reaches the center of disc 7 the contact segments are in their original setting and have either caught up with trolley 3, or trolley 3 is but slightly in advance of the insulated segment 40. In the latter case a reversal of the process will be started to a very slight degree until the insulated segment has fully caught up with trolley 3. In most cases, however, the pressure supply is such that the insulated segment will have caught up with trolley 3 on the initial return movement. The increase or decrease of pressure supply for any given deviation of trolley 3 may be varied by varying the speed of rotation of disc 7, through any suitable change-speed gear S or if desired by varying the speed of the follow-back drive. In either case, the result obtained is a variation of the degree of actuation of the supply means relative to the degree of actuation of the follow-back.

It will thus be seen that I have provided a meeting action in that I have first increased the pressure supply to counteract the decrease of pressure in the system and then have provided means whereby the pressure is raised to the initial setting. This means, it will be observed, constitutes means for continuing to operate transmitter 16 to increase the supply even after the decrease of pressure in the system has been arrested, this being effected by causing roller 15 to continue to operate transmitter 16 even when the insulated segment 40 has caught up with trolley 3; and then keeping the supply at this point without diminution during the return movement of trolley 3 and the follow-up segments until the initial position is reached.

In the above illustration, I have assumed that a decrease of pressure occurred in the system owing to too rapid withdrawal of energy relative to the supply, and the operation of the device in the opposite case, that is, where the pressure rises owing to diminution of withdrawal relative to the supply, will be apparent, since the process is merely the reverse of that hereinbefore described, the transmitter 16 being actuated to decrease the supply instead of increasing it.

From the follow-up drive there may be operated as from shaft 5 carrying the gears 47 and 48, a transmitter 6 for transmitting the indication of pressure to one or more distant synchronized receivers for indicating the pressure at a remote point or points.

Centralizing springs 32 and 34 may be provided for centralizing the armatures of the various sets of electro-magnets.

Limit switches 29 and 30 may be provided to cooperate with a stem 31 to break the circuit through magnets 12 and 13 when the rolled 15 reaches the outward limits of movements on said disc 7. In addition limit switches 29' may be provided on the shaft of the transmitter 16 so that this shaft can only make one revolution. Hence self synchronization is preserved.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described by invention, what I claim and desire to secure by Letters Patent is:

1. In a fluid pressure system, a source of pressure supply, reversible means for actuating said source to increase or decrease the same, means movable in one direction or the other in response to changes of pressure in said system, and means whereby said second means controls said first means, said last-named means including delayed-action means brough into action when said second means changes its direction for delaying reversal of said first means.

2. In a fluid pressure system, a source of pressure supply, reversible means for actuating said source to increase or decrease the same, means movable in one direction or the other in response to changes in pressure in said system, and means whereby said second means controls said first means, said last-named means including a constant speed friction disc, a friction roller in driving engagement therewith, means whereby movement of said responsive means in one direction or the other moves said roller radially away from or toward the center of said disc, means whereby movement of said roller away from the disc center actuates said first means to increase or decrease said supply to return said responsive means to original position, and means for rendering said roller ineffective to control said first means during the return movement thereof toward the center of said disc and until passing beyond said center in the opposite direction.

3. In a fluid pressure system, a source of pressure supply, reversible means for actuating said source to increase or decrease the same, means movable in one direction or the other in response to changes of pressure in said system, and means whereby said second means controls said first means, said last-named means including a constant speed friction disc, a friction roller in driving engagement therewith, means whereby movement of said responsive means in one direction or the other moves said roller radially away from or toward the center of said disc, means whereby movement of said roller away from the disc center actuates said first means to increase or decrease said supply to return said responsive means to original position, and means for rendering said roller ineffective to control said first means during the return movement thereof toward the center of said disc and until passing beyond said center in the opposite direction, said last-named means including a ratchet connection between said roller and said first means.

4. In a fluid pressure system, a source of pressure supply, reversible means for actuating said source to increase or decrease the same, means movable in one direction or the other in response to changes of pressure in said system, and means whereby said second means controls said first means, said last-named means including a constant speed friction disc, a friction roller in driving engagement therewith, means whereby movement of said responsive means in one direction or the other moves said roller radially away from or toward the center of said disc, means whereby movement of said roller away from the disc center actuates said first means to increase or decrease said supply to return said responsive means to original position, and means for rendering said roller ineffective to control said first means during the return movement thereof toward the center of said disc and until passing beyond said center in the opposite direction, said last-named means including a pair of oppositely acting ratchets between said roller and said first means, one of said ratchets being effective to actuate said first means when said roller rotates in one direction and the other of said ratchets being effective when said roller rotates in the opposite direction, and means whereby said ratchets are selectively connected to said roller as said roller moves away from or toward the center of said disc.

5. In a fluid pressure system, a source of pressure supply, reversible means for actuating said source to increase or decrease the same, means movable in one direction or the other in response to changes of pressure in said system, and means whereby said second means controls said first means, said last-named means including a contant speed friction disc, a friction roller in driving engagement therewith, means whereby movement of said responsive means in one direction or the other moves said roller radially away from or toward the center of said disc, means whereby movement of said roller away from the disc center actuates said first means to increase or decrease said supply to return said responsive means to original position, and means for rendering said roller ineffective to control said first means during the return movement thereof toward the center of said disc and until passing beyond said center in the opposite direction, said last-named means including a pair of gear drives between said roller and said first means, means whereby said gears are selectively rendered effective as said roller moves away from or toward the center of said disc, each of said drives including a ratchet, said ratchets being oppositely disposed.

In testimony whereof I have affixed my signature.

MORTIMER F. BATES.